(12) United States Patent
Hudson et al.

(10) Patent No.: US 9,022,102 B2
(45) Date of Patent: May 5, 2015

(54) CONTROL OF SUB SURFACE SAFETY VALVES

(75) Inventors: Steven Martin Hudson, Sturminster Newton (GB); Alexandra Vasil'evna Rogacheva, Southampton (GB); Bridget Mary Weston, Warminster (GB); Robert Charles Bromwich, Blandford Dorset (GB)

(73) Assignee: Expro North Sea Limited, Reading (GB)

( * ) Notice: Subject to any disclaimer, the term of this patent is extended or adjusted under 35 U.S.C. 154(b) by 861 days.

(21) Appl. No.: 12/999,779

(22) PCT Filed: Jun. 16, 2009

(86) PCT No.: PCT/GB2009/001499
§ 371 (c)(1),
(2), (4) Date: Dec. 17, 2010

(87) PCT Pub. No.: WO2009/153551
PCT Pub. Date: Dec. 23, 2009

(65) Prior Publication Data
US 2011/0094752 A1    Apr. 28, 2011

(30) Foreign Application Priority Data

Jun. 18, 2008 (GB) .................................. 0811223.7
Jun. 18, 2008 (GB) .................................. 0811224.5

(51) Int. Cl.
*E21B 23/00* (2006.01)
*E21B 34/06* (2006.01)
(Continued)

(52) U.S. Cl.
CPC ............ *G01V 11/002* (2013.01); *E21B 34/066* (2013.01); *E21B 47/12* (2013.01)

(58) Field of Classification Search
USPC .................................. 166/373, 66, 66.6, 65.1
See application file for complete search history.

(56) References Cited

U.S. PATENT DOCUMENTS

| 5,587,707 A | 12/1996 | Dickie et al. |
| 5,745,047 A | 4/1998 | Van Gisbergen et al. |

(Continued)

FOREIGN PATENT DOCUMENTS

| WO | WO 01/55555 A1 | 8/2001 |
| WO | WO 01/65054 A1 | 9/2001 |
| WO | WO 01/65061 A1 | 9/2001 |

OTHER PUBLICATIONS

International Search Report and Written Opinion of corresponding PCT International Application No. PCT/GB2009/001499 dated Nov. 4, 2009.

(Continued)

*Primary Examiner* — Kenneth L Thompson
*Assistant Examiner* — Michael Wills, III

(57) ABSTRACT

A well installation includes a metallic structure having downhole metallic tubing for conveying product towards the surface, a sub surface safety valve disposed in the downhole metallic tubing for interrupting flow of product towards the surface when closed and allowing flow of product towards the surface when open. Also, valve control means are disposed downhole and arranged for detecting electrical signals in the downhole metallic tubing and for holding the valve open while receiving an electrical signal, and surface signaling means for applying an electrical signal to metallic structure of the well for transmission via the downhole metallic tubing towards the valve control means so as to hold the valve open. The system can be made more robust by ensuring that the control means will only hold the valve open while receiving a signal of given characteristics to help prevent stray currents erroneously holding the valve open.

24 Claims, 4 Drawing Sheets

(51) Int. Cl.
*G01V 11/00* (2006.01)
*E21B 47/12* (2012.01)

(56) References Cited

U.S. PATENT DOCUMENTS

| | | |
|---|---|---|
| 2001/0033164 A1 | 10/2001 | Vinegar et al. |
| 2002/0036085 A1 | 3/2002 | Bass et al. |
| 2002/0084913 A1 | 7/2002 | Hudson et al. |
| 2003/0042016 A1 | 3/2003 | Vinegar et al. |
| 2003/0066652 A1 | 4/2003 | Stegemeier et al. |
| 2003/0121366 A1 | 7/2003 | Tateiwa et al. |
| 2003/0227393 A1 | 12/2003 | Vinegar et al. |
| 2005/0051334 A1 | 3/2005 | Baugh et al. |

OTHER PUBLICATIONS

UK Search Report for corresponding GB Application No. 0811224.5 dated Jul. 20, 2008.
UK Search Report for corresponding GB Application No. 0811223.7 dated Oct. 14, 2008.
International Preliminary Report on Patentability of corresponding PCT International Application No. PCT/GB2009/001499 dated Jun. 2, 2010.

CONTROL OF SUB SURFACE SAFETY VALVES

CROSS REFERENCE TO RELATED APPLICATIONS

This application is a national stage of PCT International Application No. PCT/GB2009/001499, filed on Jun. 16, 2009, and published in English on Dec. 23, 2009, as WO 2009/153551 A1, and which claims priority to GB 0811223.7 filed on Jun. 18, 2008 and GB 0811224.5 filed on Jun. 18, 2008, the entire disclosures of which are incorporated herein by reference.

TECHNICAL FIELD

This invention relates to the control of sub surface safety valves.

BACKGROUND OF THE INVENTION

Sub surface safety valves are provided in oil and gas wells to shut off the flow of product from the formation towards the surface in situations where continuing flow of product could be dangerous. It is now universal practice that all producing wells should include a functioning sub surface safety valve. This means that if a sub surface safety valve fails and it is uneconomic to work over the well installation and provide a new valve, the whole well will have to be shut down.

Typically sub surface safety valves are operated via hydraulic control lines from the surface of the well. They are generally arranged to be fail safe such that if the supply of hydraulic fluid is interrupted to the valve, the valve will close. It is of course possible for sub surface safety valves to fail in use or for there to be some damage to the control line.

At least some sub surface safety valves are installed as tubing retreivable safety valves such that if the valve itself fails it may be withdrawn from the well without decommissioning the whole well and replaced by a new valve. In such circumstances the new valve will automatically connect into the control line ports to allow control of the new valve. Even with such a system in place, if there is some problem with the control line, a situation can be reached where it is not possible to conventionally provide a functioning sub surface safety valve and the whole well may need to be shut down at least for work over.

The present invention is directed at providing alternative solutions.

BRIEF SUMMARY OF THE INVENTION

It would of course be desirable to have a system where it was possible to avoid the decommissioning of a well due to failure of a sub surface safety valve. Such a system might be one where the chance of this happening is minimised as far as possible from day one, or a solution where it is possible to retrofit a valve in a well where an existing hydraulically controlled sub surface safety valve has failed.

Of course any system provided should preferably be very robust so that almost whatever occurs, the sub surface safety valve will be closable at appropriate times and there should preferably be a way to effect such closing of the valve from the surface when this is desired.

According to one aspect of the present invention there is provided a well installation comprising metallic structure including downhole metallic tubing for conveying product towards the surface, a sub surface safety valve disposed in the downhole metallic tubing for interrupting flow of product towards the surface when closed and allowing flow of product towards the surface when open, valve control means disposed downhole and arranged for detecting electrical signals in the downhole metallic tubing and for holding the valve open whilst receiving an electrical signal, and surface signalling means for applying an electrical signal to metallic structure of the well for transmission via the downhole metallic tubing towards the valve control means so as to hold the valve open.

According to another aspect of the present invention there is provided a method of controlling a sub surface safety valve in a well installation which comprises metallic structure including downhole metallic tubing for conveying product towards the surface, the sub surface safety valve being disposed in the downhole metallic tubing for interrupting flow of product towards the surface when closed and allowing flow of product towards the surface when open, the method comprising the steps of:

applying an electrical signal to metallic structure of the well for transmission via the downhole metallic tubing towards the valve; detecting electrical signals in the downhole metallic tubing in the region of the valve; and holding the valve open whilst an electrical signal is detected.

This can allow remote control of the valve, and more particularly allow remote powering of the control from the surface using electrical energy. That is to say, the transmission of signals downhole into the well can in effect be the transmission of power downhole to control the valve.

The installation/method can be such that there is no power source downhole for controlling operation of the valve—the power being supplied from the surface.

The electrical signal may be a dc signal. The surface signalling means may be arranged to apply a dc signal. The surface signalling means may be arranged to apply a signal which is substantially constant.

The electrical signal may be an ac signal. The surface signalling means may be arranged to apply an ac signal. The valve control means may be arranged for detecting a dc signal and/or an ac signal.

The valve control means may be arranged for holding the valve open whilst receiving an electrical signal having a predetermined characteristic. The method may comprise the step of holding the valve open whilst receiving an electrical signal having a predetermined characteristic.

The predetermined characteristic may be frequency. The valve control means may comprise a filter for filtering out signals having unwanted frequencies. The method may comprise the step of filtering out signals having unwanted frequencies.

The valve can be a latch valve in which the valve is held open by a latch which is controlled by the valve control means. The control means may be arranged to hold the latch in a latching position whilst the electrical signal is received and to cause or allow the latch to move to a release position in the absence of such a signal to allow the valve to close.

The valve may be biased towards a closed position. The valve may be arranged for being returned to an open position from a closed position by the application of pressurised fluid from the surface of the well down the tubing. Thus, for example, the power delivered downhole to control the valve may be insufficient to allow the electrical power to be used to move the valve from a closed to an open state but in many circumstances this does not matter. The fluid might be gas, liquid or a mixture of gas and liquid.

The valve control means may have a spaced pair of contacts for contacting with the downhole metallic tubing to facilitate detection of signals.

Each contact may comprise a plurality of teeth for biting into the metal of the metallic tubing to improve electrical connection. Each contact may comprise a setting means which is such as to set the control means into position in the metallic tubing and hold it against movement relative to the tubing.

The valve control means may comprise a solenoid for holding the valve open. The solenoid may control the latch.

The solenoid may be fed with current directly tapped from the metallic tubing. The solenoid may be connected between the spaced contacts.

Impedance generation means may be provided around the tubing in the region of the valve for generating a local electrical impedance in the tubing across which signals can be detected. The impedance generation means may be located so that the local electrical impedance is generated between the spaced contacts. In effect the local impedance can force more of the available current into the control means for use in holding open the valve.

The impedance generation means may be arranged to electromagnetically generate the local electrical impedance. The impedance generation means may be arranged so as to not impair the structural integrity of the tubing with which it is used. The impedance generation means may be structurally distinct from the tubing with which it is used. The impedance generation means may be arranged to generate the local electrical impedance in the tubing without modifying the dimensions or materials of the tubing in that region.

The impedance generation means may be arranged to be mounted on the tubing portion. The impedance generation means may be arranged to be mounted around the tubing portion. The impedance generation means may be arranged so that tubing may run uninterruptedly through or past the impedance generation means when the apparatus is installed and in use.

The impedance generation means may be arranged so that the value of the local electrical impedance is dependent on frequency. The impedance generation means may be arranged so that the value of the local electrical impedance is dependent on frequency and will exhibit a maximum within a predetermined range of frequencies. This means that the impedance generation means may be constructed so as to generate a relatively high impedance to signals within a chosen frequency range and a lower impedance to signals outside this range.

Preferably the impedance generation means is arranged to generate an impedance which is tuned or tuneable to a chosen frequency of signals to be seen by the local impedance.

This arrangement can force a significant portion of the electrical power flowing in the tubing into the valve control means for control of the valve. Of course if the situation allows the introduction of an insulation joint in the tubing in the region of the valve, signals may be extracted across that— with almost 100% of the power, in the tubing concerned, at that location being extractable.

The impedance generation means may comprise a generally toroidal portion of magnetic material for surrounding the tubing portion. A winding may be provided on the toroidal portion of magnetic material. This can allow the tubing portion to act as a single turn winding in a transformer also comprising the toroidal portion of magnetic material and said winding provided on the toroidal portion of magnetic material.

Here it is to be understood that word toroidal is used in a broad way to refer to any ring like shape that can encircle a length of tubing—it is not relevant what shape the ring adopts nor is it relevant what shape a cross-section through the material of the ring has.

The winding may be connected to at least one impedance component. The at least one impedance component may be chosen so that the impedance seen in a tubing portion passing through the toroidal portion of magnetic material varies with frequency. The impedance component may comprise a capacitor connected in series with the winding.

The provision of impedance generation means is more likely to be useful where the present equipment can be completion conveyed than where there is a requirement to retrofit the equipment.

The valve control means may comprise a solenoid connected between the spaced contacts for controlling the valve. A capacitor may be connected in parallel with the solenoid.

The valve control means may comprise a transformer with a first winding for receiving signals tapped from the metallic tubing and a second winding for feeding signals to a component for controlling the valve, such as a solenoid.

The first winding may be connected between the spaced contacts. An impedance component may be connected to the first winding to give a desired detection frequency characteristic. A capacitor may be connected in parallel with the first winding. The capacitor and first and second winding may be chosen so as to be tuned to the frequency of the signals to be extracted from the tubing. The number of turns on the windings can be chosen to help give the desired performance. Generally the first winding will have more turns than the second to help achieve impedance machining with the component used to control the valve.

Such arrangements may be used together with impedance generation means.

According to another aspect of the present invention there is provided a valve arrangement comprising a subsurface safety valve for location in downhole metallic tubing for interrupting flow of product towards the surface when closed and allowing flow of product towards the surface when open and valve control means for detecting electrical signals in the downhole metallic tubing and for holding the valve open whilst receiving an electrical signal.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
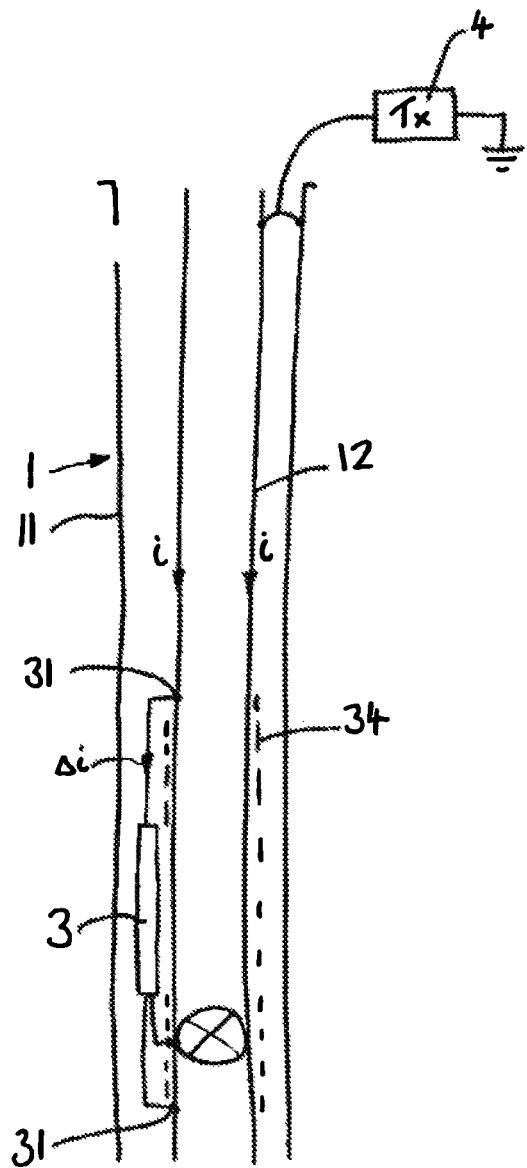
FIG. 1 schematically shows a well installation including a sub surface safety valve and associated control unit.

FIG. 1 schematically shows a well installation comprising downhole metallic tubing 1 comprising casing 11 and within this, production tubing 12. A sub surface safety valve 2 is provided downhole in the well within the production tubing 12. This sub surface safety valve 2 is provided for permitting the flow of product, that is oil and/or gas, towards the surface during normal circumstances but obstructing such flow when circumstances necessitate this. A sub surface safety valve control unit 3 is provided downhole in the region of the sub surface safety valve 2.

A power signal transmitter 4 is provided at the surface and is connected to the downhole metallic tubing 1. In practical terms it makes little difference whether the transmitter 4 is connected to the casing 11 or production tubing 12, or even the well head, because in general terms the casing 11 and production tubing 12 will be in contact with one and other at many locations within the well and thus they tend to act as a single conduction path.

Another terminal of the transmitter 4 is connected to ground and thus valve controlling signals may be applied to the metallic tubing 1 for transmission downhole towards the valve control module 3. In some implementations the connections to ground might be via another, nearby, well.

The valve control module 3 has a spaced pair of contacts 31 which contact with the downhole metallic tubing 1, in particular, with the production tubing 12 in this embodiment. Although not shown in detail in the drawings, in a set up of the type shown in FIG. 1, the valve control unit 3 may be completion conveyed with the production tubing 12 for example as a mandrel tool which fits around the production tubing 12. As such very good electrical connection can be easily achieved between the valve control module 3 and the production tubing 12.

In operation as the transmitter 4 transmits signals into the metallic tubing 1, a resulting current i will flow in the tubing 11, 12. Where this current i meets the contacts 31 a proportion of the current .DELTA.i will flow through the valve control module 3. This proportion of the current .DELTA.i can be used to control operation of the valve 2.

In the present embodiment no power source is provided downhole for control of the valve 2. Rather power is extracted directly from the signals i applied to the metallic tubing 11, 12 by the transmitter 4. Thus there is direct power supply from the surface for controlling the valve 2. The valve control module 3 is arranged so that provided signals having an appropriate frequency are received from the metallic structure 11, 12, the valve 2 will be held open.

On the other hand if such signals cease, the valve will be allowed to close.

Of course such ceasing of the signals i may be as the result of a deliberate act of stopping transmission from the surface transmitter 4 or may be due to more unexpected circumstances such as a failure of the transmitter 4 or some larger scale failure of the well installation as a whole.

The valve control module 3 includes some capability to discriminate between signals having the correct characteristic showing them to be from the transmitter 4 and other signals which might be in the metallic structure of the well e.g. noise. To put this another way, the valve control module 3 has filtering capabilities. Thus if signals are picked up having the incorrect frequency these will not be sufficient to hold the valve 2 open in the absence of signals i from the surface transmitter 4.

Figure 2:
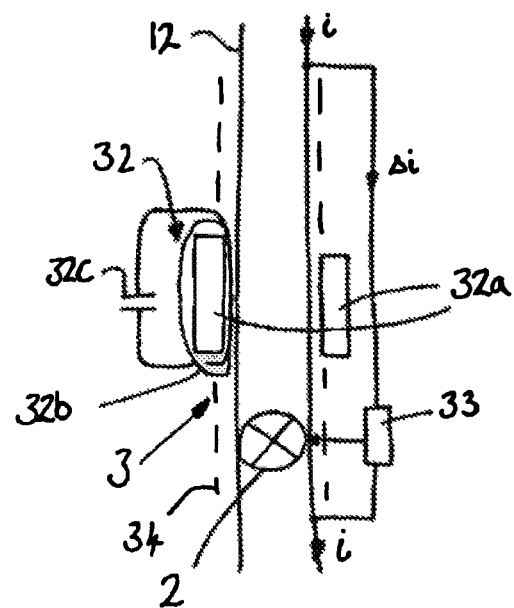
FIG. 2 schematically shows in more detail the control unit of the installation shown in FIG. 1.

FIG. 2 shows more detail of the valve control module 3 of the well installation shown in FIG. 1. In this embodiment the valve control module 3 comprises impedance generation means 32 disposed in the region of the valve 2. The impedance generation means 32 is arranged for generating a local electrical impedance in the production tubing 12 in the region of the valve 2. The impedance generation means comprises a generally toroidal piece of magnetic material 32a around which is wound a winding 32b which is connected in series with a capacitor 32c. The winding 32b, magnetic material 32a and the production tubing 12 passing through the toroid of magnetic material 32a act as a transformer with the production tubing 12 acting as a single turn winding. The magnetic material 32a, winding 32b and capacitor 32c are chosen so that a significant electrical impedance is seen by electrical signals flowing in the production tubing as it passes through the toroid 32a. More particularly the value of the capacitor and number of turns of the winding 32b are chosen so that, in effect, the impedance generation means 32 is tuned to the frequency of the signals i transmitted by the transmitter 4. That is to say, the impedance generation means 32 is arranged so that there is resonance at the signal frequency of the transmitter 4 generating a high electrical impedance in the tubing 12 at that location to signals having the signal frequency.

In order to get good transmission characteristics through the metallic structure 11, 12 of the well, the transmitter 4 will be arranged to transmit at very low frequencies for example at 10 Hz or below. Thus the capacitor must be chosen to have a value which is appropriate for generating the high impedance in the tubing 12 at such very low frequencies. The provision of a multi-turn winding around the toroidal core 32a whilst the production tubing 12 is a single turn winding helps to decrease the capacitance value required to produce a usefully increased impedance in the production tubing in the region of the impedance generation means 32.

It has been found by the applicant that it is possible to generate an impedance of in the order of 50 m.OMEGA. and, whilst in absolute terms this is not a high electrical impedance, compared with the impedance of a section of production tubing without the presence of such impedance generation means there is vast difference. Thus such an arrangement helps to drive more current .DELTA.i through the valve control module 3 so that this current i is available for control of the valve 2.

Of course if circumstances were to allow, an insulation joint might be provided in the tubing 12 in the region of the control module 3, but in many circumstances the provision of such an insulation joint is impossible or highly undesirable.

The control module 3 also comprises a solenoid 33 which is connected in series between the spaced contacts 31 and receives the current .DELTA.i which is caused to flow through the valve control module 3. This solenoid 33 is used to directly control the operation of the valve 2, in particular to hold the valve to open whilst there is sufficient current .DELTA.i flowing through the solenoid 33.

It will be appreciated that the impedance generation means 32 provides a filtering function in that the impendance generated in the production tubing 12, is tuned to a particular frequency and thus it is this frequency which will be driven through the valve control module 3. Other frequencies which are substantially unaffected by the impedance generation means 32 will continue to flow almost entirely through the production tubing 12 and thus in normal circumstances would be insufficient to provide sufficient current in the solenoid 3 to hold the valve 2 to open. Of course in alternatives further filtering means may be provided in the valve control module 3 to block out frequencies outside of a desired range.

Insulation 34 may be provided on the outer surface of the production tubing 12 between the spaced contacts 31 to insulate against electrical contact between the production tubing 12 and casing 11 in that region.

Figure 3:
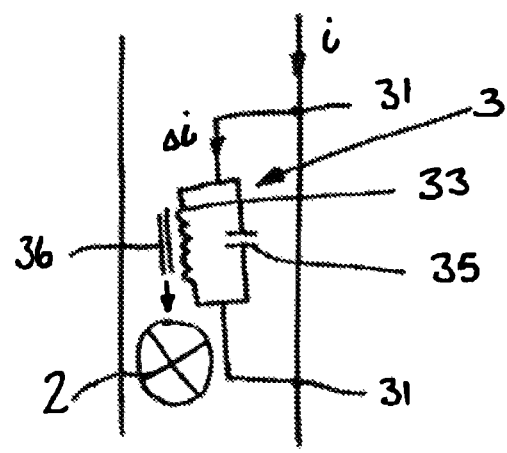
FIG. 3 schematically shows an alternative sub surface safety valve control arrangement.

FIG. 3 shows in schematic form an alternative form of valve control module 3. This form of valve control module 3 is one which is more suited to a retro fitting operation where the provision of an insulation joint or impedance generation means 32 to affect the production string 12 is not possible.

Such a control module 3 can be used as part of a replacement valve arrangement comprising a valve 2 along with the control module 3. The valve arrangement can be introduced into the production tubing of the well in place of a tubing retrievable valve unit that has ceased to function and been removed.

Figure 5:
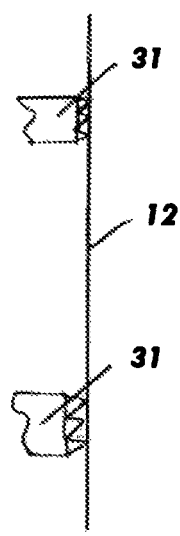
FIG. 5 schematically shows an embodiment of a spaced pair of contacts relative to a production tubing.

Thus, in this case the valve control module 3 is provided in a tool which is housed within the production tubing 12. It again has a spaced pair of contacts 31 which in the embodiment shown in FIG. 5 will take the form of a spaced pair setting devices each of which comprises a plurality of teeth which are arranged to bite into the metal of the production tubing 12 in order to make good mechanical and electrical contact. Here again the objective is to try to encourage as much current .DELTA.i from the signaling current i in the metallic structure 11, 12 to flow through the valve control module 3.

Here a solenoid winding 33 is connected in parallel with a capacitor 35 and these two components are connected in series between the spaced contacts 31. The solenoid winding 33 is provided with a magnetic core 36 and arranged to control the valve 2. That is to say, the solenoid 33, 36 is arranged to hold the valve to open whilst sufficient current .DELTA.i flows through the solenoid 33. Again here the capacitor 35 is chosen in combination with the characteristics of the solenoid winding 33 in order to promote maximum current flow through the solenoid 33 at the signalling frequency of the applied signals i.

Again of course additional filtering may be provided if necessary.

In an alternative implementation a substantially non-varying dc signal may be applied at the surface by a transmitter corresponding to that 4 shown in FIG. 1. In such a case a resulting dc current will flow in the metallic structure 11, 12 which can be "scavenged" for use in holding open the valve 2. With a dc implementation the valve control module 3 will be similar to that shown in FIG. 3 but with the capacitor 35 omitted as 'tuning' will not be relevant. The scavenged current will flow in the solenoid winding 33 to hold open the valve 2. Using dc gives good signal transmission characteristics but has the disadvantage of not being as helpful in applying differentiation between bona fide and fault/random signals.

Figure 4A:
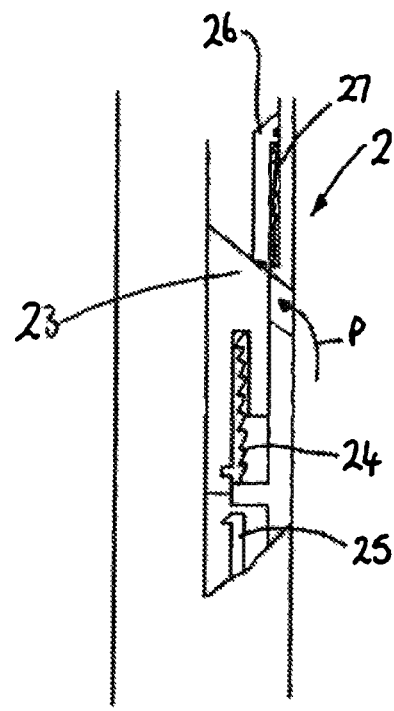
FIGS. 4A to 4C schematically show a valve, of a type which may be used in the set ups shown in FIGS. 1 to 3, in a closed position, a reset position and an open position.
Figure 4B:
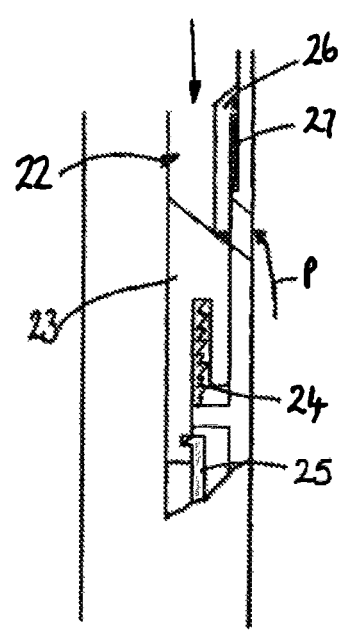
Figure 4C:
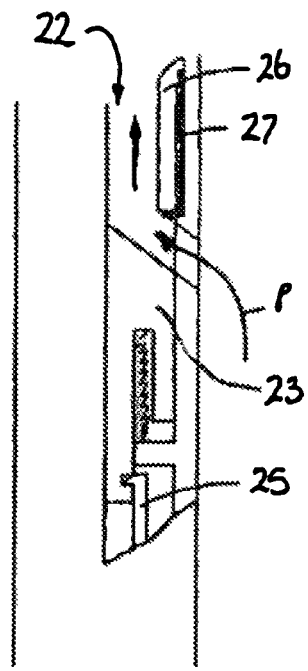

FIGS. 4A to 4C show more detail of one type of valve 2 which may be used in the arrangements such as those shown in FIGS. 1 to 3. This is a latching poppet valve which can be moved from the closed state to the open state by the application of pressure from the surface.

The valve 2 is shown in the closed state in FIG. 4A, in a transition state in FIG. 4B and in the open state in FIG. 4C. In the open state product P can flow through an opening 21 and into the main body 22 of the valve 2 and through and out of the valve 2 for onwards transmission towards the surface.

The valve comprises a main piston 23 which is arranged for axial movement within the main body 22 to selectively obscure the opening 22 and thus block the path of product through the valve 2. The main piston 23 is shown in the obstructing position in FIG. 4A. The main piston 23 is biased towards this obstructing position by a spring 24 but is held open against the action of this spring 24 by a latch 25 when the valve is in the open position as shown in FIG. 4C.

Thus in the open position as shown in FIG. 4C the latch 25 is holding the piston 23 against the action of the spring 24. This means that to hold the valve in the open position shown in FIG. 4C no great amount of energy is required. Thus it will be seen how a relatively low energy solenoid 33 in the arrangement shown in FIGS. 2 and 3 can be used to hold this latch 25 in the latching position and thus hold the valve 2 open during normal use.

It will also be appreciated that the valve control modules 3 are arranged so that when power to the solenoid 33 is ceased the latch 25 can move out of engagement with the main piston 23 such that the main piston 23 may be forced by the spring 24 into the closed position shown in FIG. 4A.

The valve 2 also comprises an auxiliary piston 26 which is shown in a rest position in FIGS. 4A and 4C. It is held in this rest position by a spring 27. However if the valve 2 is overpressured from the surface then, as shown in FIG. 4B, this pressure acts on the auxiliary piston 26 driving it downwards against the main piston 23. Together, the auxiliary piston 26 and main piston 23 move downwards from the position shown in FIG. 4A to the position shown in FIG. 4B. This means that the main piston 23 may be relatched with the latch 25 to return it to the open position as shown in FIG. 4C. Once the overpressure from the surface is removed, the auxiliary piston 26 can be driven back to its rest position by the spring 27 so that the valve returns so its open state as shown in FIG. 4C.

The details of this valve 2 as shown in FIGS. 4A to 4C are included just by way of example to illustrate the type of valve which might be used with the direct surface powered control systems as shown in FIGS. 1 to 3. Useful aspects of this valve 2 are that very low power is required to hold the valve 2 in the open position and no downhole power is required to reopen the valve from a closed position as this may be achieved by applying overpressure from the surface. The present control systems may be used with other similar type valves 2 which are commercially available for use in the oil and gas industry.

The invention claimed is:

1. A well installation comprising, metallic structure including downhole metallic tubing which includes production tubing for conveying product towards the surface, a sub surface safety valve disposed in the production tubing for interrupting flow of product towards the surface when closed and allowing flow of product towards the surface when open, a valve control module disposed downhole and arranged for detecting electrical signals in the production tubing and for holding the valve open while receiving an electrical signal, and surface signaling apparatus for applying an electrical signal to the metallic structure of the well for transmission via the downhole metallic tubing towards the valve control module so as to hold the valve open, wherein the installation comprises a retro-fittable tool which is housed within the production tubing and comprises the valve control module, the valve control module having a spaced pair of contacts for contacting with the production tubing at a respective pair of locations spaced from one another along the length of the production tubing so that a first contact in the pair is located at a different longitudinal position on the production tubing than a second contact in the pair, and in use, a proportion of an electric current flowing in the production tubing is picked up by the first contact, flows through the valve control module, and returns to the production tubing via the second contact to facilitate detection of signals at the valve control module.

2. A well installation according to claim 1 in which the power for controlling operation of the valve is supplied from the surface.

3. A well installation according to claim 1 in which the valve control module is arranged for holding the valve open while receiving an electrical signal having a predetermined characteristic.

4. A well installation according to claim 3 in which the predetermined characteristic is frequency.

5. A well installation according to claim 4 in which the valve control module comprises a filter for filtering out signals having unwanted frequencies.

6. A well installation according to claim 1 in which the valve is a latch valve in which the valve is held open by a latch which is controlled by the valve control module.

7. A well installation according to claim 1 in which the valve control module comprises a solenoid for holding the valve open.

8. A well installation according to claim 7 in which the solenoid is connected between the spaced contacts.

9. A well installation according to claim 1 in which the valve control module comprises a transformer with a first winding for receiving signals tapped from the production tubing and a second winding for feeding signals to a component for controlling the valve.

10. A well installation according to claim 9 in which the first winding is connected between the spaced contacts.

11. A well installation according to claim 10 in which an impedance component is connected to the first winding to give a desired detection frequency characteristic.

12. A well installation according to claim 11 in which a capacitor is connected in parallel with the first winding and the capacitor and first and second windings are chosen so as to be tuned to the frequency of the signals to be extracted from the tubing.

13. A well installation according to claim 1 in which the retro-fittable tool comprises the sub surface safety valve.

14. A well installation according to claim 1 in which the surface signaling apparatus is arranged for applying an electrical signal with a predetermined characteristic and the valve control module is arranged for holding the valve open while receiving an electrical signal having said predetermined characteristic showing the signal to be from the surface signaling apparatus.

15. A method of controlling a sub surface safety valve in a well installation which comprises metallic structure including downhole metallic tubing which includes production tubing for conveying product towards the surface, the sub surface safety valve being disposed in the production tubing for interrupting flow of product towards the surface when closed and allowing flow of product towards the surface when open, the well installation comprising a valve control module disposed downhole, and surface signaling apparatus for applying an electrical signal to the metallic structure of the well, wherein the installation comprises a retro-fittable tool which is housed within the production tubing and comprises the valve control module, the valve control module having a spaced pair of contacts for contacting with the production tubing at a respective pair of locations spaced from one another along the length of the production tubing so that a first contact in the pair is located at a different longitudinal position on the production tubing than a second contact in the pair, and in use, a proportion of an electric current flowing in the production tubing is picked up by the first contact, flows through the valve control module, and returns to the production tubing via the second contact to facilitate detection of signals at the valve control module,
the method comprising the steps of: using the surface signaling apparatus to apply an electrical signal to metallic structure of the well for transmission via the downhole metallic tubing towards the valve; detecting electrical signals in the downhole metallic tubing in the region of the valve using the valve control module; and holding the valve open while an electrical signal is detected.

16. A method according to claim 15 in which the power for controlling operation of the valve is supplied from the surface.

17. A method according to claim 15 which comprises the step of holding the valve open while receiving an electrical signal having a predetermined characteristic.

18. A method of controlling a subsurface safety valve according to claim 15 in which the step of applying an electrical signal comprises the step of applying an electrical signal having a predetermined characteristic, and the step of holding the valve open while an electrical signal is detected comprises holding the valve open while an electrical signal having said predetermined characteristic is detected.

19. A method of controlling a subsurface safety valve according to claim 15 in which the step of holding the valve open while an electrical signal is detected comprises holding the valve open while an electrical signal having a predetermined frequency characteristic is detected.

20. A well installation comprising, metallic structure including downhole metallic tubing which includes production tubing for conveying product towards the surface, a sub surface safety valve disposed in the production tubing for interrupting flow of product towards the surface when closed and allowing flow of product towards the surface when open, valve control means disposed downhole and arranged for detecting electrical signals in the production tubing and for holding the valve open while receiving an electrical signal, and surface signaling means for applying an electrical signal to the metallic structure of the well for transmission via the downhole metallic tubing towards the valve control means so as to hold the valve open, wherein the installation comprises a retro-fittable tool which is housed within the production tubing and comprises the valve control means, the valve control means having a spaced pair of contacts for contacting with the production tubing at a respective pair of locations spaced from one another along the length of the production tubing so that a first contact in the pair is located at a different longitudinal position on the production tubing than a second contact in the pair, and in use, a proportion of an electric current flowing in the production tubing is picked up by the first contact, flows through the valve control means, and returns to the production tubing via the second contact to facilitate detection of signals at the valve control means.

21. A well installation according to claim 20 in which the surface signaling means is arranged for applying an electrical signal with a predetermined characteristic and the valve control means is arranged for holding the valve open while receiving an electrical signal having said predetermined characteristic showing the signal to be from the surface signaling means.

22. A well installation according to claim 20 in which the valve control means is arranged for holding the valve open while receiving an electrical signal having a predetermined frequency characteristic.

23. A well installation comprising, metallic structure including downhole metallic tubing which includes production tubing for conveying product towards the surface, a sub surface safety valve disposed in the production tubing for interrupting flow of product towards the surface when closed and allowing flow of product towards the surface when open, a valve control module disposed downhole and arranged for detecting electrical signals in the production tubing and for holding the valve open while receiving an electrical signal, and surface signaling apparatus for applying an electrical signal to the metallic structure of the well for transmission via the downhole metallic tubing towards the valve control module so as to hold the valve open, wherein the installation comprises a retro-fittable tool which is housed within the production tubing and comprises the valve control module, the valve control module having a spaced pair of contacts for contacting with the production tubing at a respective pair of locations spaced from one another along the length of the production tubing so that a first contact in the pair is located at a different longitudinal position on the production tubing than a second contact in the pair, and in use, a proportion of an electric current flowing in the production tubing is picked up by the first contact, flows through the valve control module, and returns to the production tubing via the second contact to facilitate detection of signals at the valve control module, each contact comprising a setting device provided on the tool which comprises a plurality of teeth for biting into the metal of the production tubing to improve electrical connection, and is so as to set the tool and hence control module into position in the production tubing and hold it against movement relative to the production tubing.

24. A well installation comprising, metallic structure including downhole metallic tubing which includes production tubing for conveying product towards the surface, a sub surface safety valve disposed in the production tubing for interrupting flow of product towards the surface when closed and allowing flow of product towards the surface when open, a valve control module disposed downhole and arranged for detecting electrical signals in the production tubing and for holding the valve open while receiving an electrical signal, and surface signaling apparatus for applying an electrical signal to the metallic structure of the well for transmission via the downhole metallic tubing towards the valve control module so as to hold the valve open, in which the surface signaling apparatus is arranged for applying an electrical signal with a predetermined characteristic and the valve control module is arranged to discriminate between signals having the predetermined characteristic showing the signal to be from the surface signaling apparatus, and other signals and the valve control module is arranged for holding the valve open only while receiving an electrical signal having said predetermined characteristic showing the signal to be from the surface signaling apparatus.

* * * * *